US007472718B2

(12) United States Patent  
Ball (10) Patent No.: US 7,472,718 B2
(45) Date of Patent: Jan. 6, 2009

(54) ASSEMBLY TO MOUNT A HYDRANT TO A ROOF

(75) Inventor: William T. Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 11/554,232

(22) Filed: Oct. 30, 2006

(65) Prior Publication Data

US 2007/0095396 A1    May 3, 2007

Related U.S. Application Data

(60) Provisional application No. 60/596,962, filed on Nov. 1, 2005.

(51) Int. Cl.
*E03B 9/02* (2006.01)

(52) U.S. Cl. .................. 137/295; 137/357; 52/40
(58) Field of Classification Search .......... 137/272, 137/294, 295, 357, 373; 52/40
See application file for complete search history.

(56) References Cited

U.S. PATENT DOCUMENTS

| 1,621,905 A * | 3/1927 | Russell ............ 137/294 |
| 3,162,407 A * | 12/1964 | Yax ................. 248/514 |
| 4,034,174 A * | 7/1977 | McCord .......... 200/81.9 R |
| 5,906,341 A * | 5/1999 | Brown .............. 248/49 |
| 7,143,779 B2 * | 12/2006 | Parker ............. 137/375 |

* cited by examiner

*Primary Examiner*—Kevin L Lee
(74) *Attorney, Agent, or Firm*—Sheridan Ross PC (57) ABSTRACT

An assembly for mounting a hydrant to a roof. The assembly includes a housing that is adapted to fit about a standpipe that is disposed through a roof top. The assembly additionally has a sealing member that is positioned between the housing and the standpipe and a mounting plate that is connected to the housing to mount the hydrant to the roof.

19 Claims, 8 Drawing Sheets

ASSEMBLY TO MOUNT A HYDRANT TO A ROOF

CROSS REFERENCE TO RELATED APPLICATION

This application claims the benefit of U.S. Provisional Application No. 60/596,962 filed Nov. 1, 2005.

BACKGROUND OF THE INVENTION

This invention is directed to a mounting assembly for a hydrant, and more particularly to an assembly for mounting a yard hydrant to a roof.

Hydrants are sometimes installed on the roof of a building for cleaning purposes such as washing condenser or air conditioning coils. To mount the hydrant, different makeshift devices have been used. For example, bollards have been installed and then the hydrant is secured to the roof. Alternatively, a hydrant has been attached to a plastic shift box that is tarred over. Neither of these approaches provides a stable connection that also prevents water leakage. Accordingly, there is a need in the art for a mounting assembly that addresses these problems.

Therefore, a principal object of the present invention is to provide an assembly to mount a hydrant to a roof that minimizes leakage, provides support and is easy to install.

These and other objects, features, or advantages of the present invention will become apparent from the specification and claims.

SUMMARY OF THE INVENTION

An assembly for mounting a hydrant to a roof having a housing that fits about a standpipe of the hydrant. Positioned between the housing and the standpipe is a sealing member. The housing is connected to a mounting plate that is adapted to be connected to the roof of a building.

DETAILED DESCRIPTION OF THE PREFERRED EMBODIMENTS

Generally, a yard hydrant 10 has a valve body 12, a valve seat 14, possibly a drain port or hole 16, an inlet 18 which is connected to a source of pressurized water (not shown) and an outlet 20 at its top. Connected at one end to the valve body 12 is a standpipe 22 that extends vertically and is connected to a head casting 24 at the opposite end.

The head casting 24 has an inlet 26 coupled to the standpipe 22 and a discharge conduit or outlet 28 that preferably extends downwardly and outwardly from the head casting 24 and a fluid conduit 30 that extends between the inlet 26 and the outlet 28.

Disposed within the valve body 12 is a closure valve plunger 32 that is connected to a valve stem or actuator rod 34 that extends from the closure valve 32 through the standpipe 22 and is connected to an actuator device 36 attached to the head casting 24 such as a lever or handle. The hydrant has been described by example only, as other types of hydrants may be used without departing from the scope of the invention.

Figure 1:
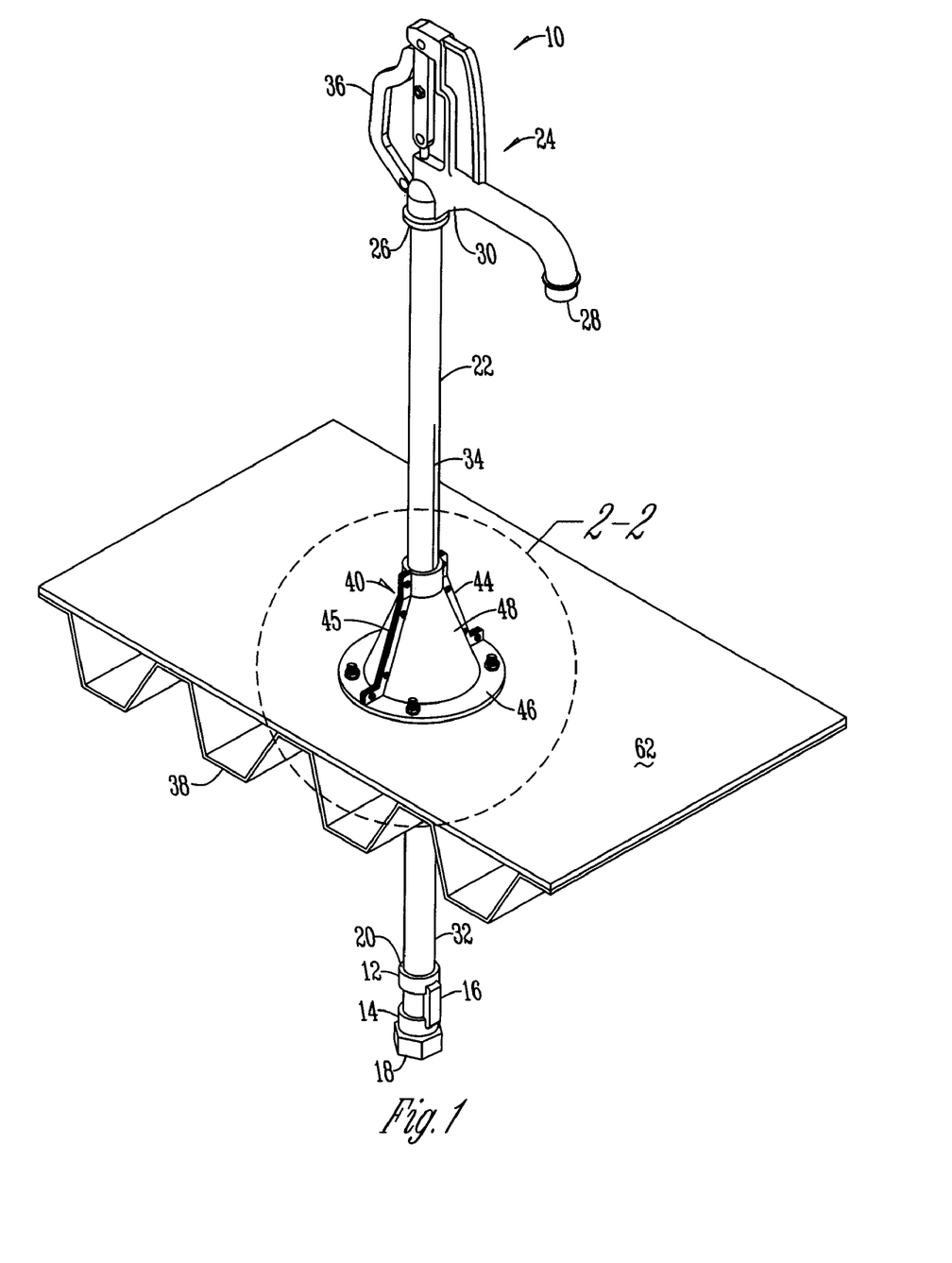
FIG. 1 is a side view of a mounting assembly and a hydrant.
Figure 2:
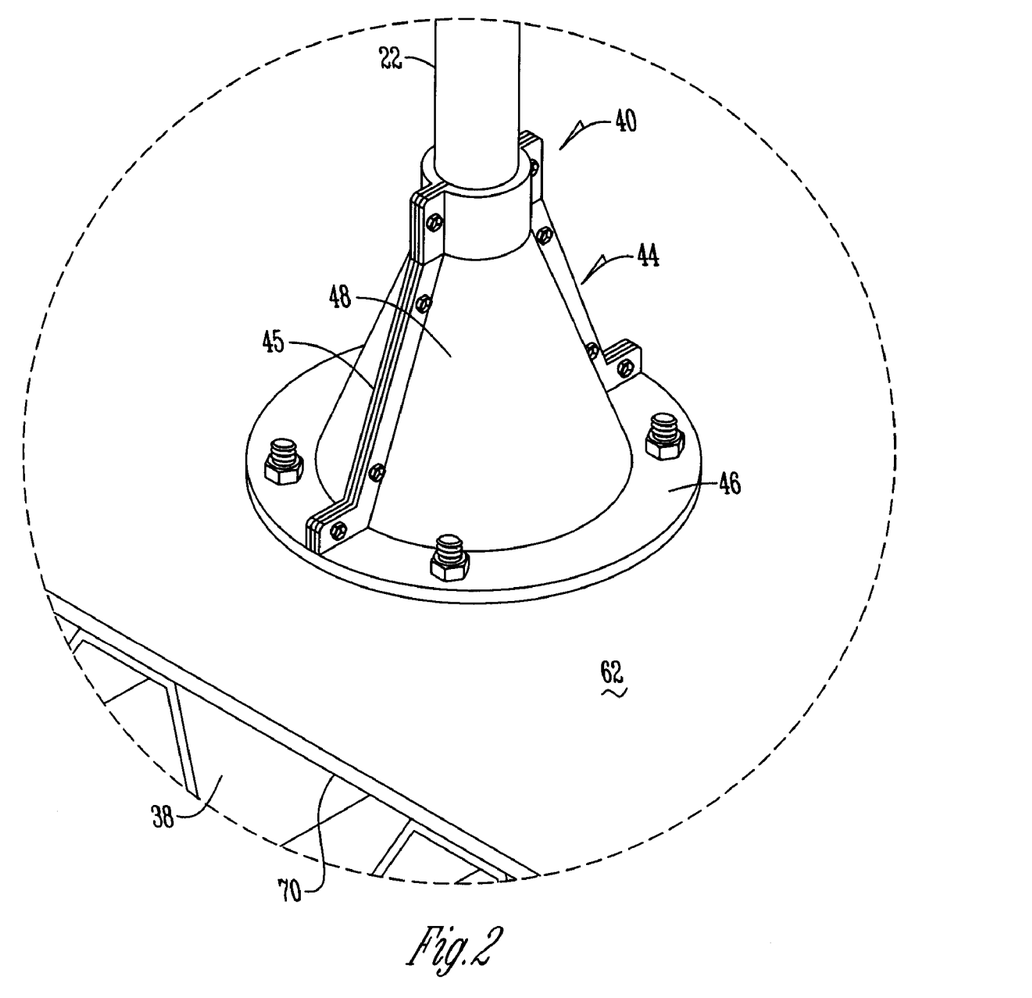
FIG. 2 is a partial perspective view of a mounting assembly.
Figure 3:
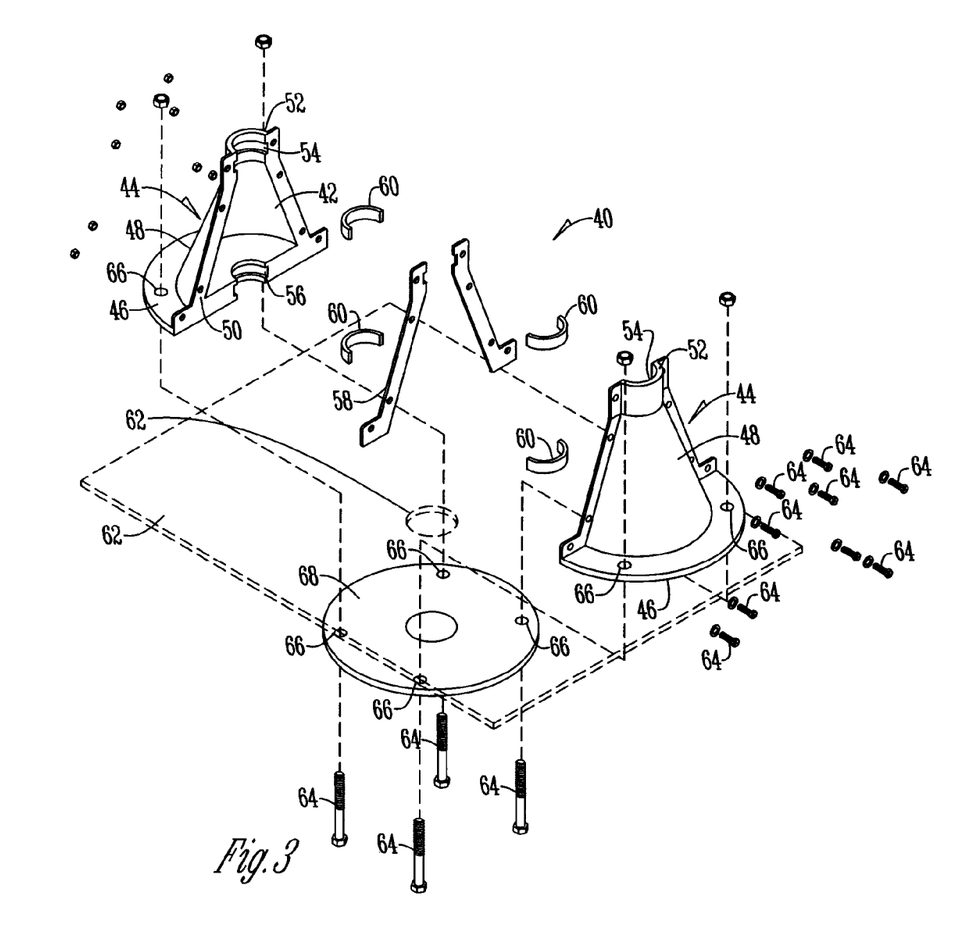
FIG. 3 is an exploded perspective view of a mounting assembly.
Figure 4:
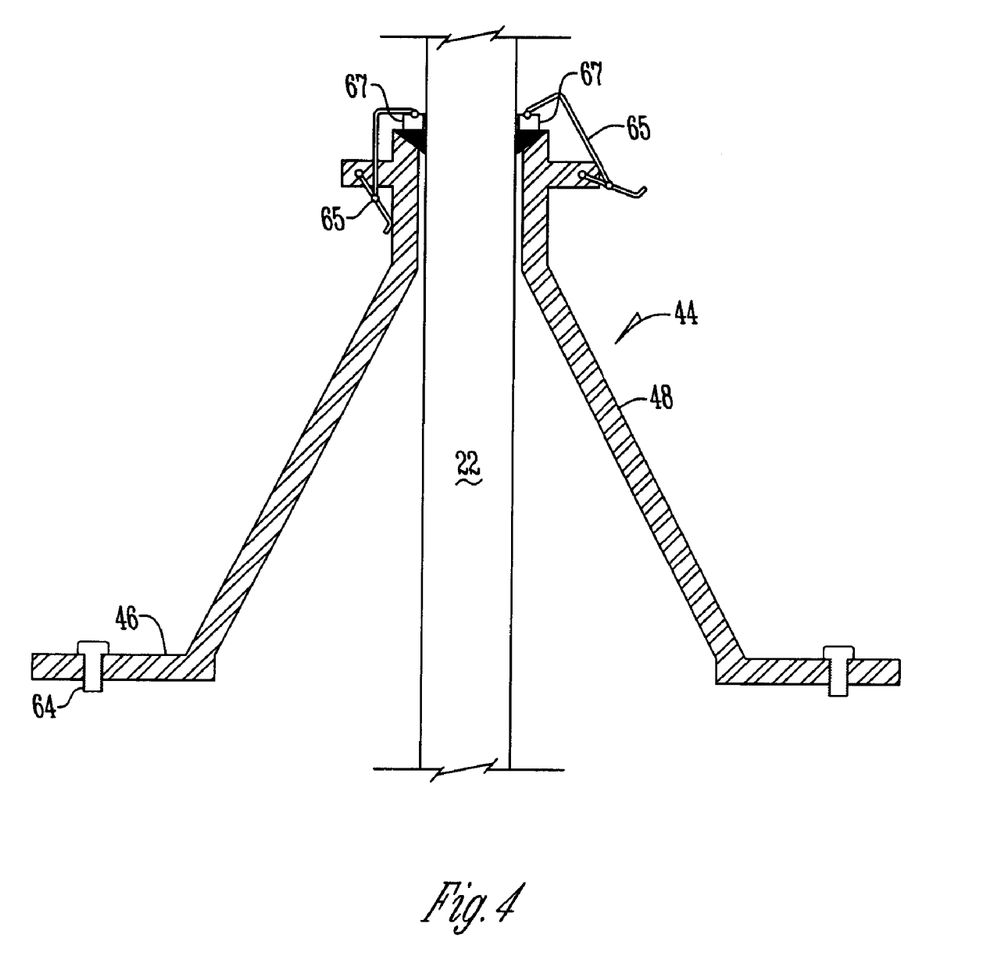
FIG. 4 is a sectional view of a mounting assembly.
Figure 5:
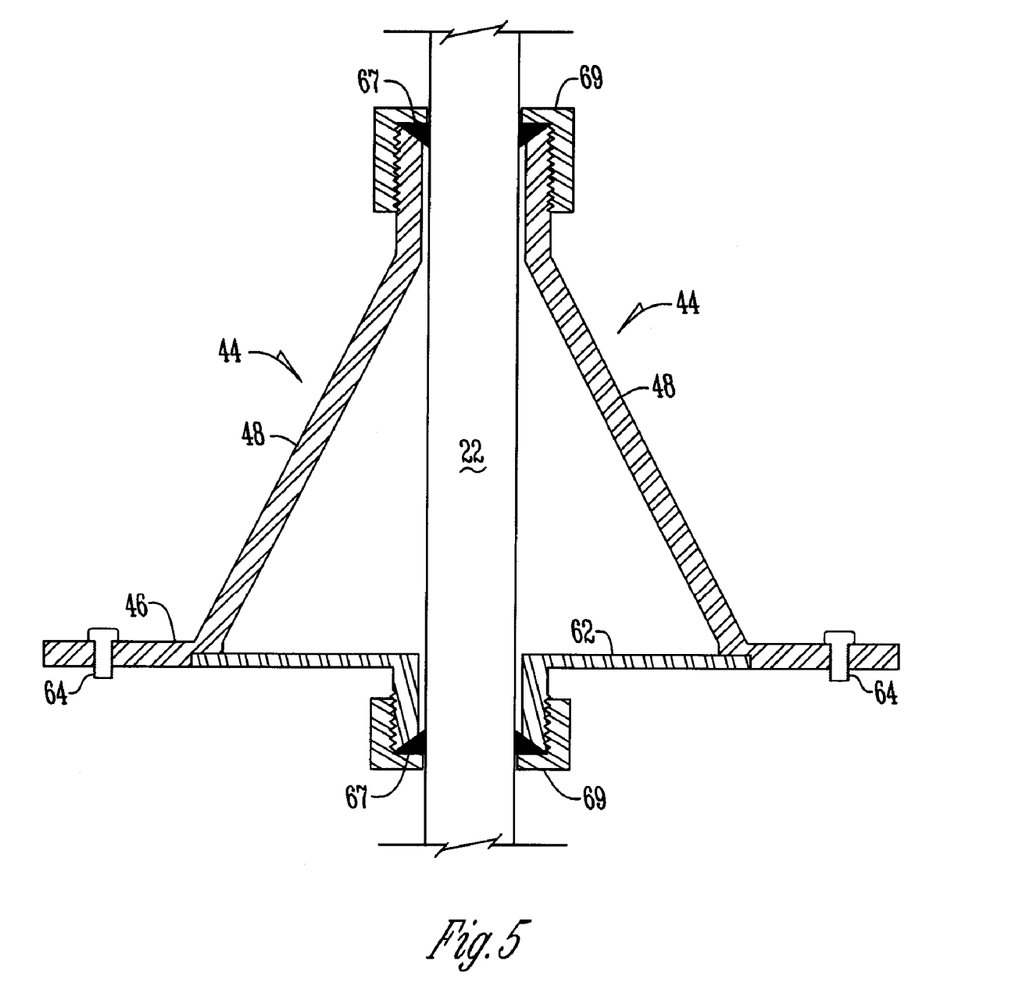
FIG. 5 is a sectional view of a mounting assembly.
Figure 6:
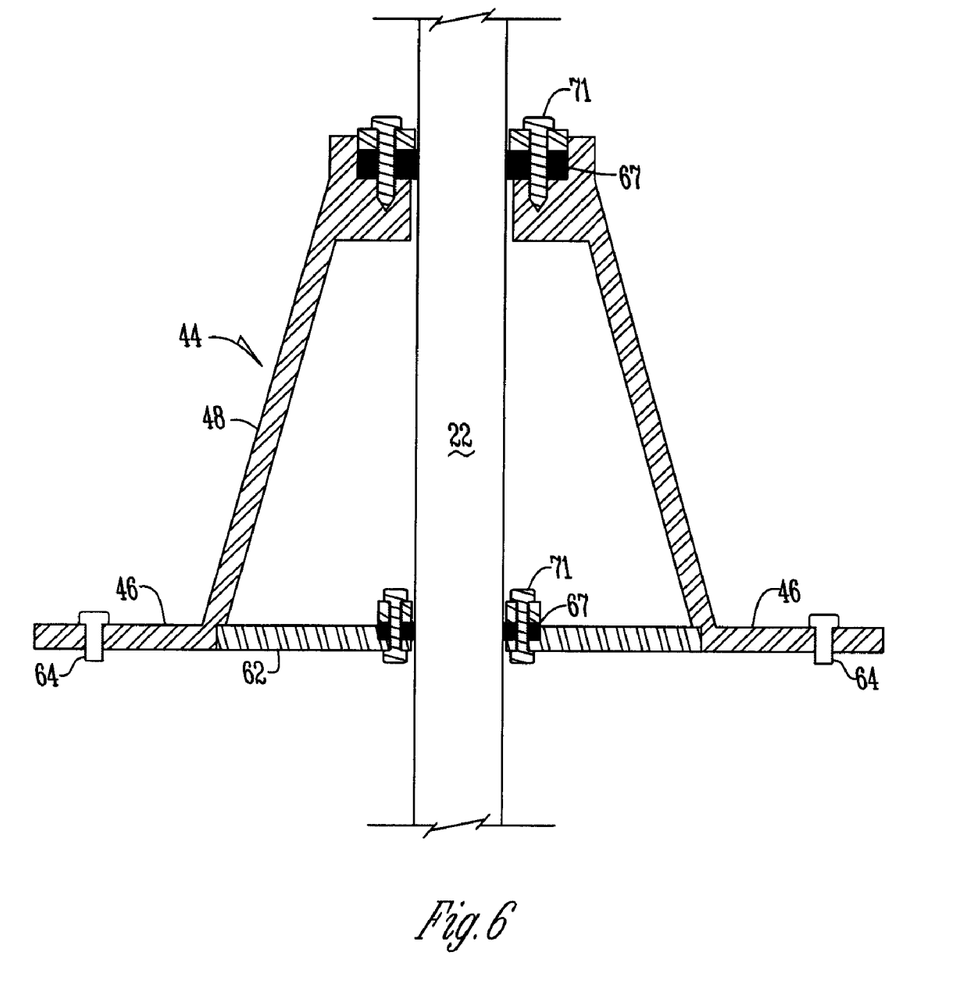
FIG. 6 is a sectional view of a mounting assembly.
Figure 7:
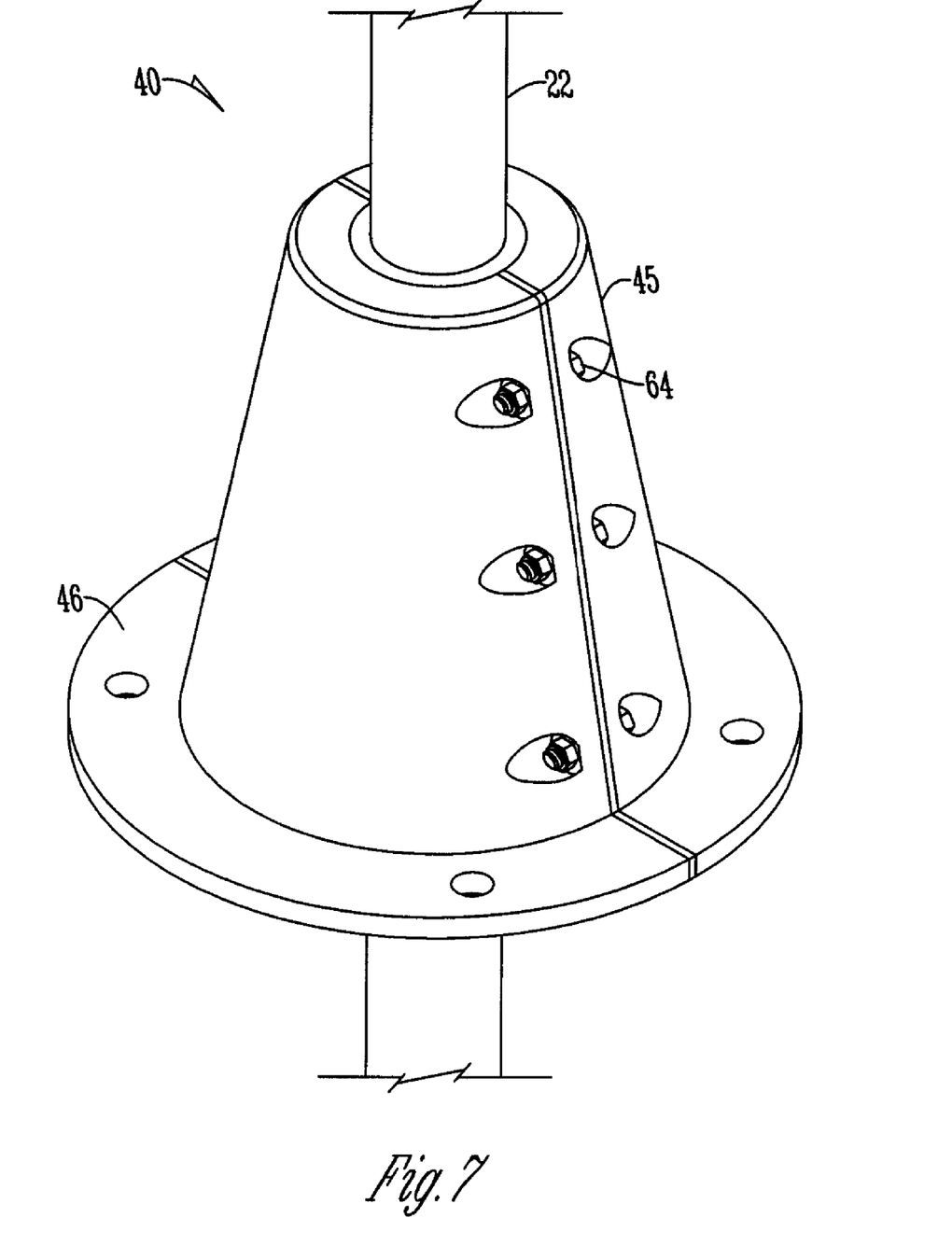
FIG. 7 is a perspective view of a mounting assembly.
Figure 8:
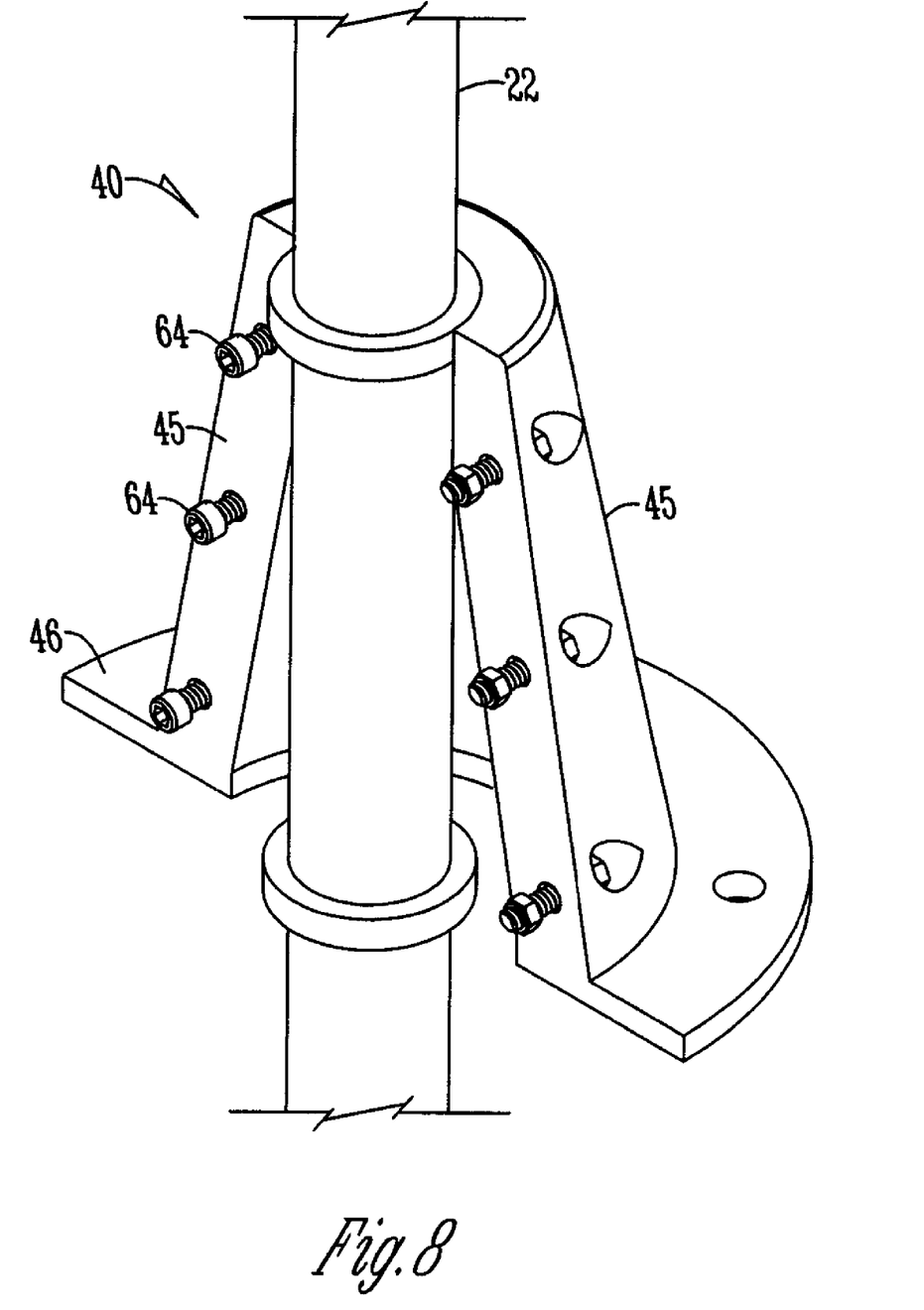
FIG. 8 is a sectional view of the mounting assembly of FIG. 7.

The hydrant 10 is secured to the roof 38 with a mounting assembly 40. The mounting assembly 40 can be of any shape and size, and is comprised of a one piece or multiple piece housing 42. Alternatively, the housing is formed by two or more cast iron flashing sections 44. The housing 42 has a base plate 46 and a support section 48. For the two piece housing 42 the inner surface 50 of each section 44 is formed to mirror the inner surface of the other section for connection by any conventional manner such as a nut and bolt or by a weld. In one example, the flashing sections 44 have a flange 45 that extends outwardly as shown in FIGS. 1-3 for receiving connecting bolts 64. Alternatively, as shown in FIGS. 7-8, the connecting flange 45 extends inwardly and receives the connecting bolts 64. Other devices may also be used to support the hydrant and prevent leakage. For example, as shown in FIG. 4, a metal clamp 65 is used with a compression ring 67 to secure the housing 42. FIG. 5 shows the use of a compression nut 69 to secure the housing 42. Also, as shown in FIG. 6, compression bolts 71 may be used to secure and seal the housing 42.

At an end 52 of the support section 48 is an opening 54 formed to receive a standpipe 22. Similarly, the base plate 48 has an opening 56 that is in spaced alignment with opening 54 and also formed to fit around the standpipe 22.

Positioned between the flashing sections 44 are sealing members 58. For example, between the inner surface 50 of each section 44 are sealing members 58. Also, positioned within openings 54 and 56 are pipe seal halves 60. Additionally, a sealing ring may be used in place of the seal halves 60. The gasket 58 and seal halves 60 create a seal around standpipe 22 to prevent leakage toward the roof.

The base plate 46 is connected to a generally flat mounting plate 62 having a central opening 63 by any conventional means such as by a plurality of nuts and bolts 64 that extend through connecting apertures.

In an alternative embodiment, a second base plate 68 is positioned on a lower surface 70 of the mounting plate 62. The second base plate 68 has a plurality of connecting apertures 66 that align with the apertures 66 of base plate 46 to receive bolts 64.

To install, the valve body 12 of the hydrant 10 is connected to a source of pressurized water (not shown). The standpipe 22 is connected to the valve body 12 and extends through an opening in the roof. The mounting plate 62 is placed over the standpipe 22 such that the standpipe 22 extends through opening 63. The flashing sections 44 are then fitted about the standpipe 22 such that the standpipe 22 extends through openings 54 and 56. Prior to fitting the flashing sections 44 together, the flat gasket 58 is positioned on the inner surface 50 of sections 44 and the pipe seal halves are positioned within openings 54 and 56 to provide a seal. Once fitted, the flashing sections 44 are connected by any conventional means and the base plate 46 of the mounting assembly 40 is connected to the mounting plate 62. The mounting plate is then secured to the roof 38 and tarred over. If a second base plate 68 is used it is placed on the standpipe 22 prior to placement of the mounting plate 62.

From this description a mounting assembly has been shown for mounting a hydrant to a roof that is stable and prevents water leakage. Thus, at least, all the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed:

1. An assembly for mounting a hydrant to a roof, comprising:
   a housing having a support section that is associated with a base plate, said support section being adapted to fit about a standpipe of the hydrant;
   a sealing member engaging said housing and adapted to engage the standpipe; and
   a mounting plate connected to at least a portion of the housing for securing the hydrant to the roof.

2. The assembly of claim 1 wherein said base plate and said support section have openings in spaced alignment.

3. The assembly of claim 1 further comprising a second base plate that is positioned beneath said mounting plate and associated with said base plate of said housing wherein said base plate and said second base plate cooperate to secure the hydrant.

4. The assembly of claim 1 wherein said housing has at least a pair of flashing sections.

5. The assembly of claim 4 wherein said pair of flashing sections have flanges that receive bolts that secure the assembly to the roof.

6. The assembly of claim 1 wherein a clamp is used with a compression ring to secure said housing to the standpipe.

7. The assembly of claim 1 wherein a compression ring and a compression nut are used to secure said housing to the standpipe.

8. The assembly of claim 1 wherein a compression bolt and a compression nut are used to secure said housing to the standpipe.

9. An assembly for mounting a hydrant to a roof, comprising:
   a support section with an upper opening that is adapted to interface with a standpipe of the hydrant;
   a base plate associated with a lower edge of said support section; and
   a second plate that cooperates with said base plate to fixedly secure the standpipe.

10. The assembly of claim 9 wherein said support section is conical.

11. The assembly of claim 9 wherein said support section is made of at least two halves.

12. The assembly of claim 9 wherein said second base plate extends within said support section and includes a lower opening that is adapted to interface with the standpipe.

13. The assembly of claim 9 further including a mounting plate that is adapted to rest on the roof, said mounting plate being adapted for interconnection with said base plate.

14. A roof-mounted hydrant, comprising:
   a hydrant having a standpipe adapted for association with a building surface;
   a means for supporting having an upper opening that engages the standpipe;
   a means for securing interconnected to said means for supporting, said means for securing adapted for interconnection to the building surface; and
   a second means for securing positioned beneath said building surface that cooperates with said means for supporting.

15. The roof-mounted hydrant of claim 14, further comprising a mounting plate poisoned below said means for securing wherein said means for securing is interconnected thereto.

16. The roof-mounted hydrant of claim 14, wherein said means for supporting is interconnected to said standpipe with at least one means for sealing.

17. The roof-mounted hydrant of claim 14 wherein said means for supporting is conical.

18. The roof-mounted hydrant of claim 14 wherein said means for supporting is made of at least two halves.

19. The roof-mounted hydrant of claim 14 wherein said second means for supporting extends within said means for supporting and includes a lower opening that is adapted to interface with the standpipe.

* * * * *